Nov. 29, 1966  E. J. SKINNER  3,287,949
MANUFACTURE OF PIPE JOINTING SLEEVES AND THE LIKE
Filed Jan. 15, 1963  11 Sheets-Sheet 1

INVENTOR
EDWARD JUDGE SKINNER
BY
ATTORNEYS

Nov. 29, 1966 E. J. SKINNER 3,287,949
MANUFACTURE OF PIPE JOINTING SLEEVES AND THE LIKE
Filed Jan. 15, 1963 11 Sheets-Sheet 2

INVENTOR
EDWARD JUDSON SKINNER
BY
ATTORNEYS

INVENTOR
EDWARD JUDGE SKINNER
BY
ATTORNEYS

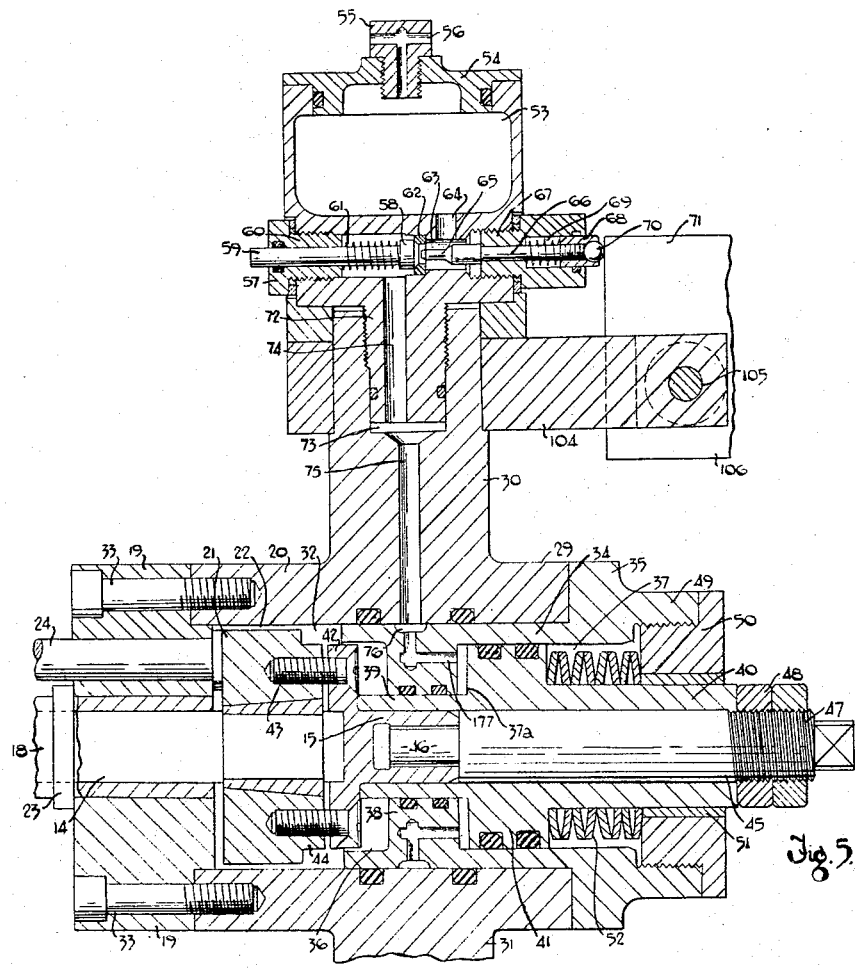

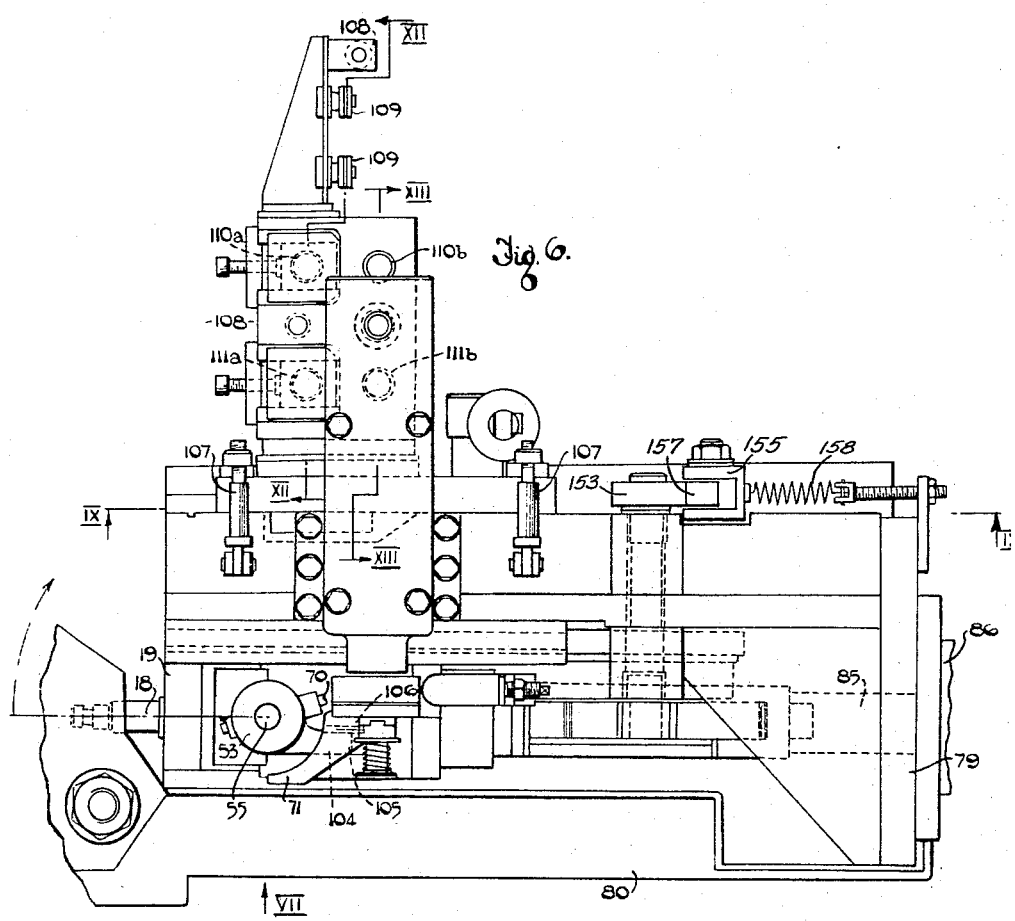

Nov. 29, 1966 E. J. SKINNER 3,287,949
MANUFACTURE OF PIPE JOINTING SLEEVES AND THE LIKE
Filed Jan. 15, 1963 11 Sheets-Sheet 7
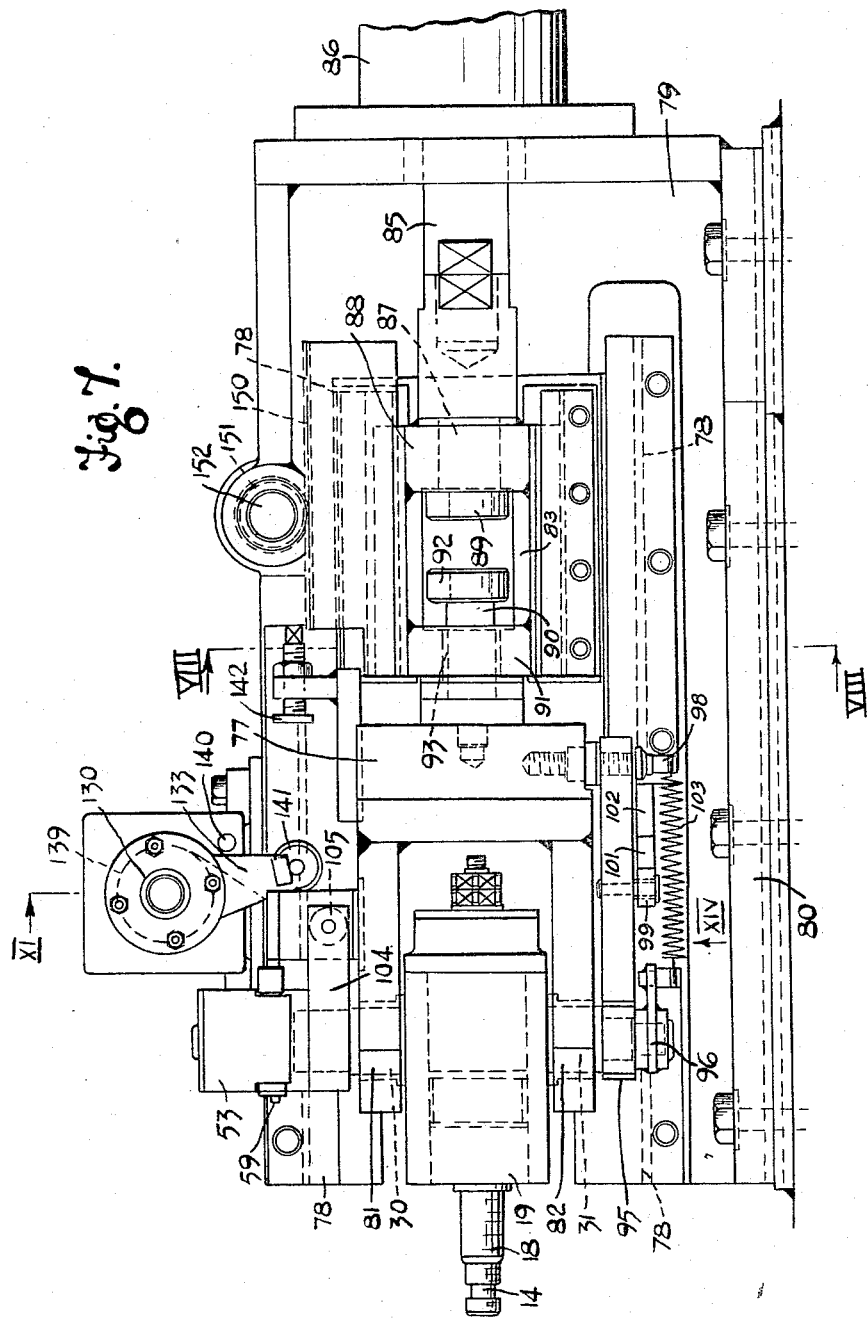
INVENTOR
EDWARD JUDGE SKINNER
BY
ATTORNEYS

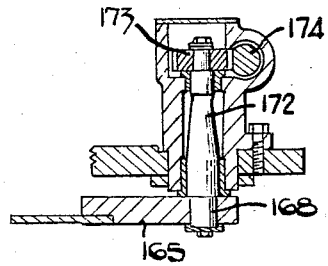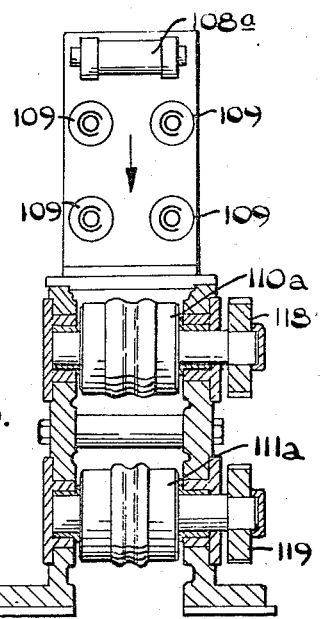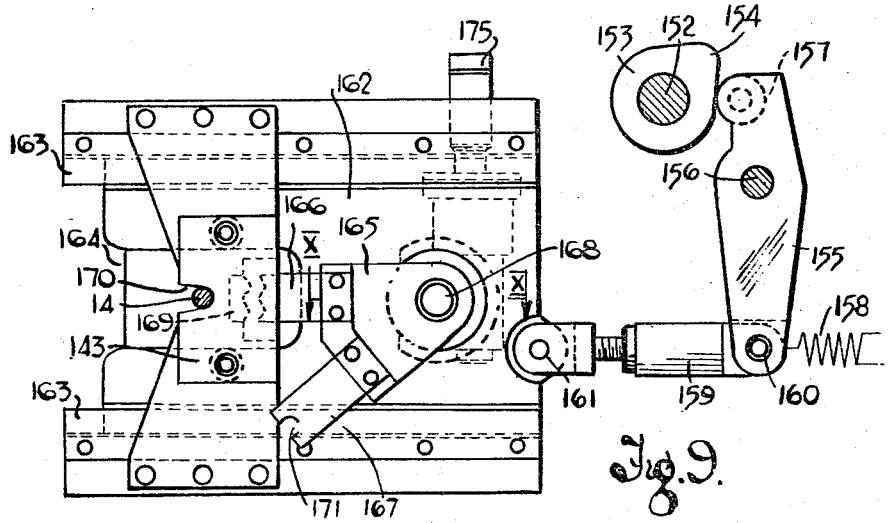

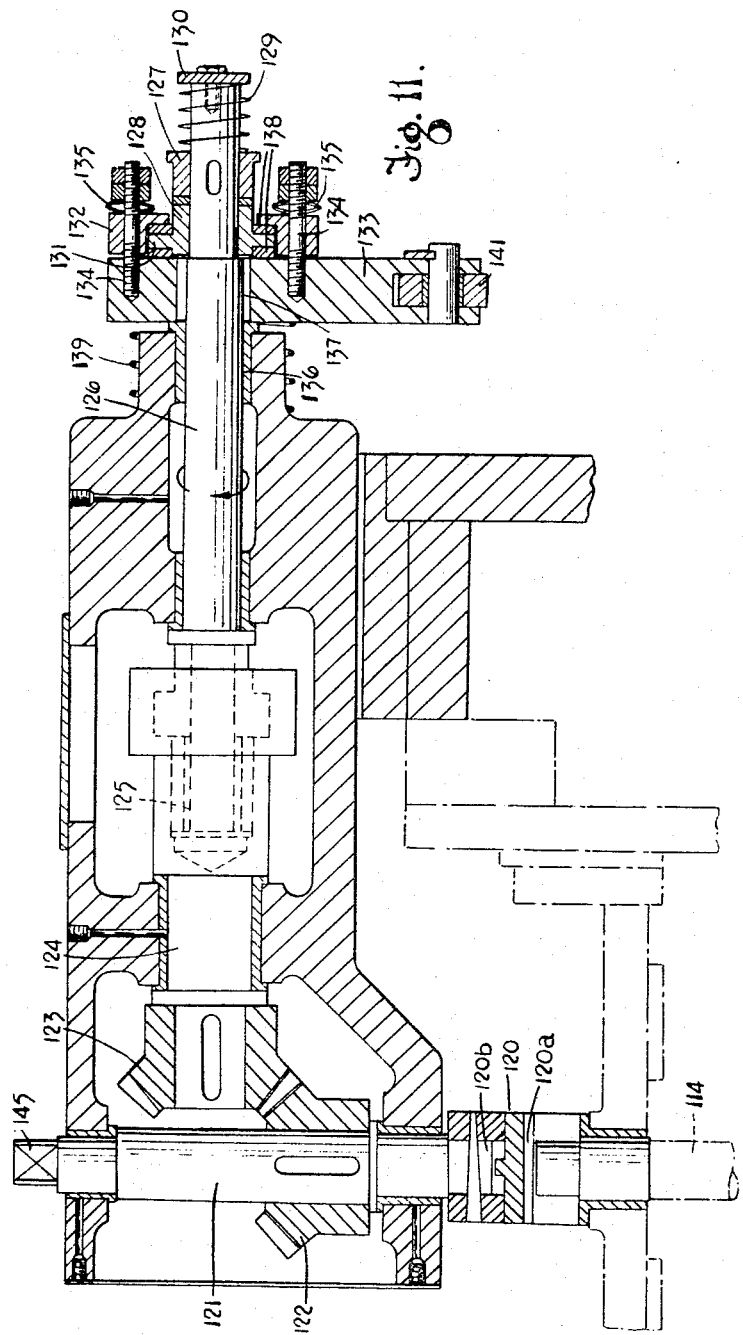

Nov. 29, 1966  E. J. SKINNER  3,287,949
MANUFACTURE OF PIPE JOINTING SLEEVES AND THE LIKE
Filed Jan. 15, 1963  11 Sheets-Sheet 10

*INVENTOR*
EDWARD JUDGE SKINNER

BY
*ATTORNEYS*

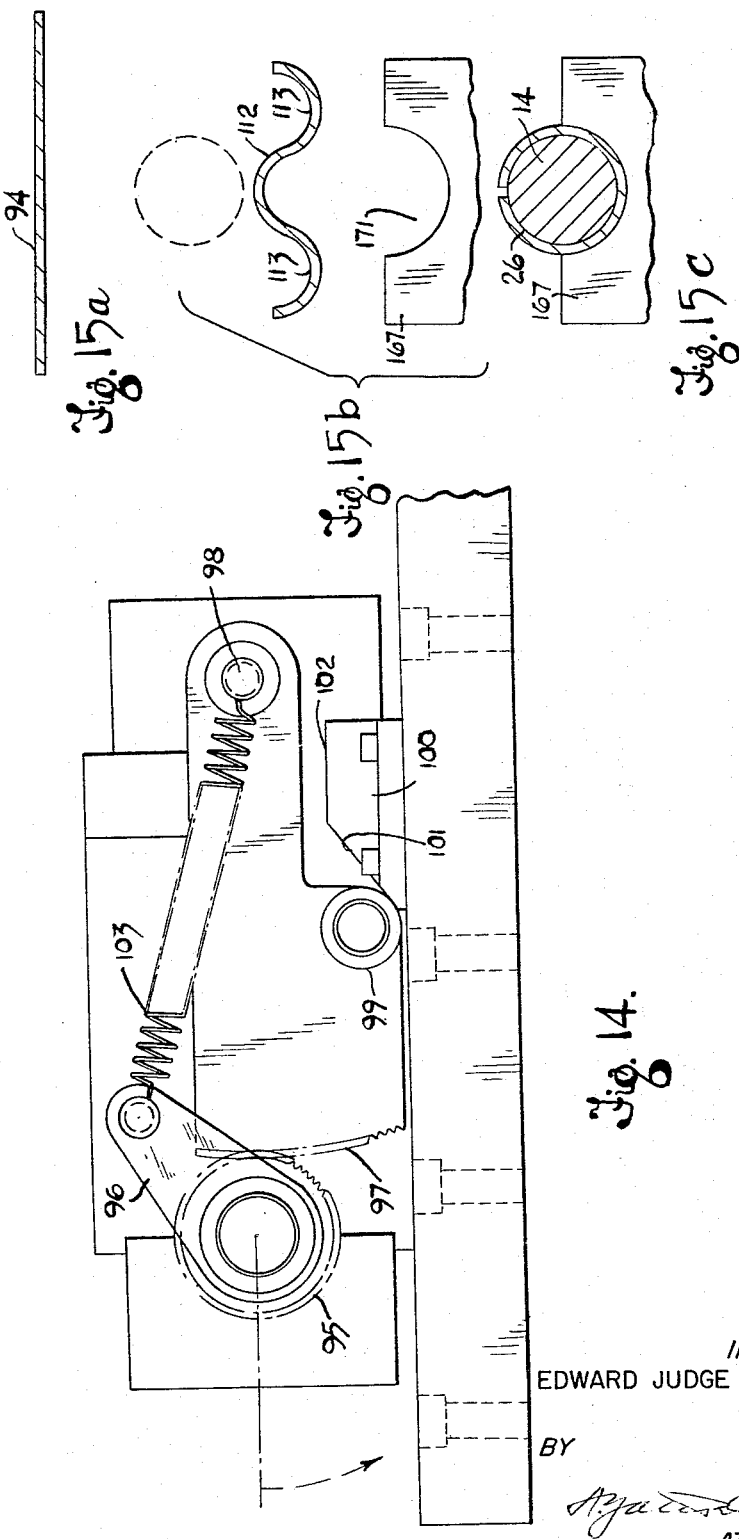

United States Patent Office 3,287,949
Patented Nov. 29, 1966

3,287,949
MANUFACTURE OF PIPE JOINTING
SLEEVES AND THE LIKE
Edward J. Skinner, Solihull, England, assignor to The
Wednesbury Tube Company Limited, Bilston, England,
a British company
Filed Jan. 15, 1963, Ser. No. 251,596
3 Claims. (Cl. 72—62)

This invention is concerned with the manufacture of pipe jointing sleeves and such like members, and particularly jointing members of the kind comprising at least in part a thin wall cylindrical pipe-receiving circular section portion of ductile metal, the wall of which is locally expanded into the form of an annular groove, the groove opening to the interior of the portion and being partially or completely filled with solder or other low-temperature melting jointing metal or alloy. A low temperature melting metal or alloy in this context means a metal or alloy having a melting point lower than that of the metal of which the jointing member is made. In effecting a joint between such a member and the end of a metal pipe, the latter is inserted as a close fit into the pipe-receiving portion which is then heated to melt the jointing metal which then flows between the contiguous metal surfaces by capillary action and sets on cooling to unite the surfaces and, if the relative dimensions of the members and the quantity of jointing metal are appropriately selected, will provide a liquid-tight seal between them.

For straight through joints, the jointing member may be a sleeve, of uniform or stepped diameter, adapted to receive a pipe at both ends and formed with at least two such grooves, located one adjacent each end. Similar members having branches extending in appropriate directions may be used for T and other multi-way junctions, and for connecting pipes to taps, terminations and other fittings.

Most commonly such jointing members are formed of copper or copper alloy and the jointing metal is a solder comprising a lead-tin alloy. The invention is not necessarily restricted to the use of these particular materials, and for convenience of description the material of the jointing member will be referred to as metal and the jointing metal itself as solder.

The object of the invention is to provide apparatus for forming an annular solder-filled recess in such a jointing member.

From a further aspect the invention resides in the improved method of manufacturing a jointing member of the kind specified comprising locating the jointing member with a pipe-receiving portion thereof held against axial movement in a closely fitting die, introducing into the open end of this portion a mandrel having an enlarged head, which is a close fit in the pipe-receiving portion, and a sleeve mounted for sliding movement on a smaller part of the mandrel.

One apparatus in accordance with the invention will now be described by way of example and with reference to the accompanying drawings, wherein:

FIGURE 5 represents a sectional view of a yoke-like support for part of the apparatus illustrated in FIGURES 2 to 4;

FIGURE 6 is a plan view of the major part of the machine in which are mounted the parts illustrated in FIGURES 2 to 5;

FIGURE 7 is a side elevation of the arrangement shown in FIGURE 6 as seen in the direction of the arrow VII in that figure;

FIGURE 9 is a part section view on the line IX—IX in FIGURE 6;

FIGURE 10 is a part sectional view on the line X—X in FIGURE 9;

FIGURE 11 is a sectional view of a portion of the machine as seen on the line XI in FIGURE 7;

FIGURE 12 is a sectional view on the line XII—XII in FIGURE 6;

FIGURE 14 is an elevation of a part of the machine as seen in the direction of the arrow XIV in FIGURE 7 and drawn to a larger scale than FIGURE 7;

Figure 16:
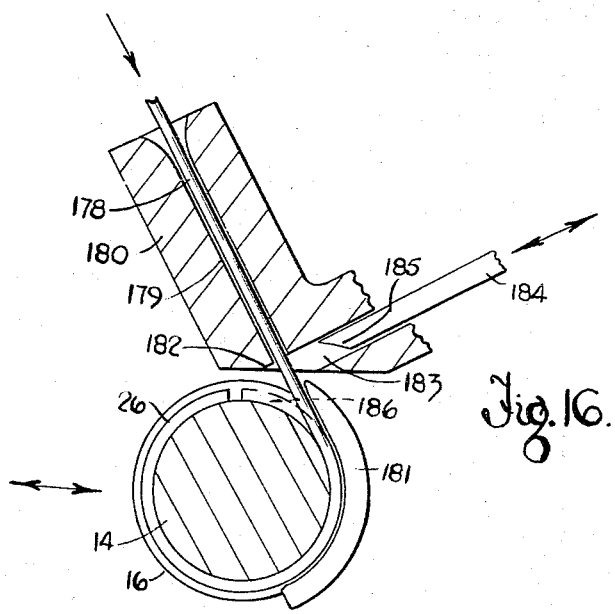

FIGURES 15a, 15b, and 15c represent diagrammatically three stages in the application of a loop of solder to the mandrel; and FIGURE 16 represents an alternative method and arrangement for applying a loop of solder to the mandrel.

Figure 1:
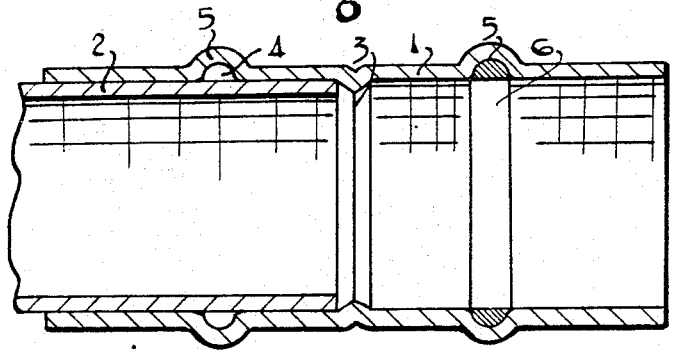
FIGURE 1 represents a joint sleeve for making a straight through joint between two pipes of equal diameter.

Referring to FIGURE 1 there is illustrated a thin walled cylindrical copper sleeve 1 which is intended to be used to form a straight through joint between the aligned ends of the two copper or brass pipes. One of the pipes 2 is shown in position in the left-hand end of the sleeve as it would appear when the joint has been made. The other end of the sleeve is shown in the condition to receive the other pipe. Midway along the sleeve 1 is formed an inwardly projecting annular abutment 3 the purpose of which is to determine the positions of the ends of the pipes in relation to the length of the sleeve 1. In the figure the end of the pipe 2 is shown in engagement with this annular abutment 3. In a position approximately midway between each end of the sleeve 1 and the annular abutment 3 the wall of the sleeve is locally expanded to form an external annular projection 5 which presents internally of the sleeve an annular recess 4. This formation is obtained by a forcible local expansion of the sleeve in the manner to be described hereinafter. As indicated at the right-hand end of FIGURE 1 the internal annular recess is filled with solder to form an annular fillet 6 the radially inner surface of which is substantially a cylindrical surface in alignment with the major internal surface of the sleeve.

Referring now to the left-hand portion of the figure, after the end of the tube 2 has been inserted into the sleeve 1 the whole is subjected to heating so that the fillet of solder 6 is melted and defuses wholly or in part by capillary action between the adjacent contiguous surfaces of the pipe 2 and sleeve 1. On cooling the solder solidifies to form a liquid-tight joint between the two members. In the left-hand side of the figure the recess 4 is shown emptied of solder which has become distributed over the adjacent surfaces.

Figure 2:
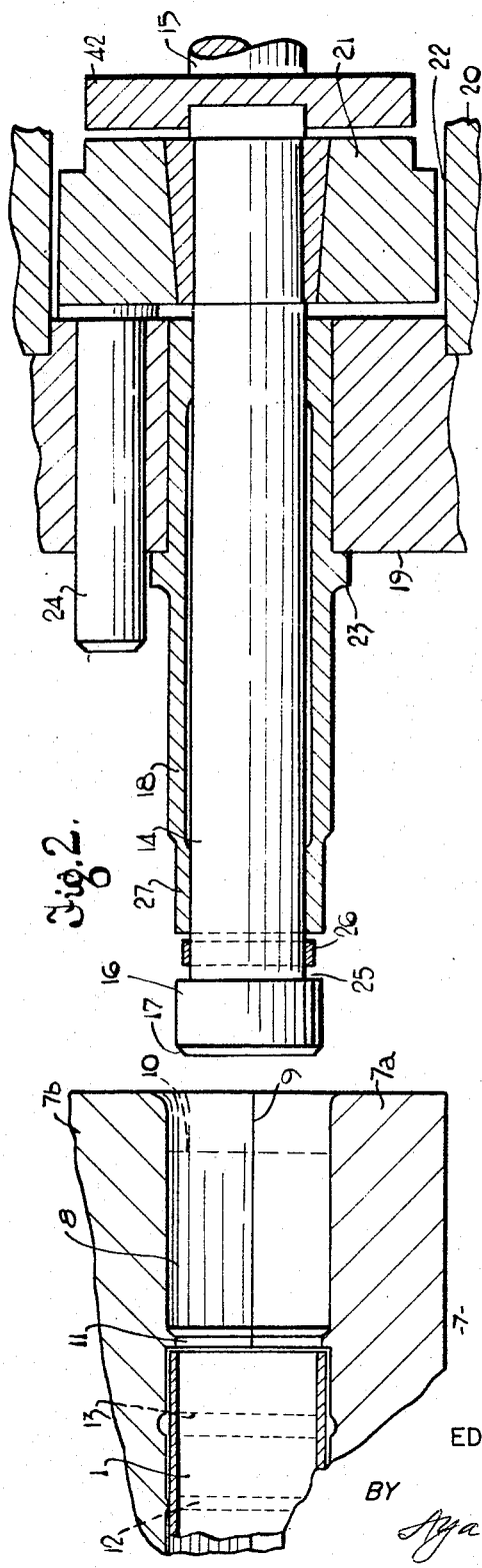
FIGURE 2 is a diagrammatic representation of the die and mandrel prior to the insertion of the mandrel into the die.
Figure 3:
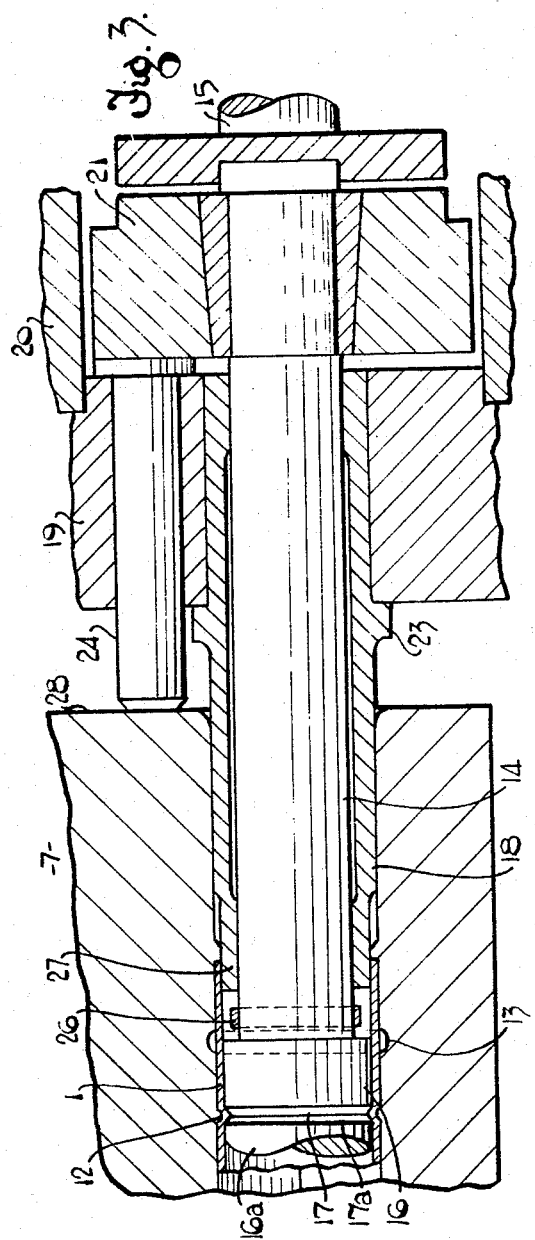
FIGURE 3 represents the same apparatus at the end of the first stage of the operation.
Figure 4:
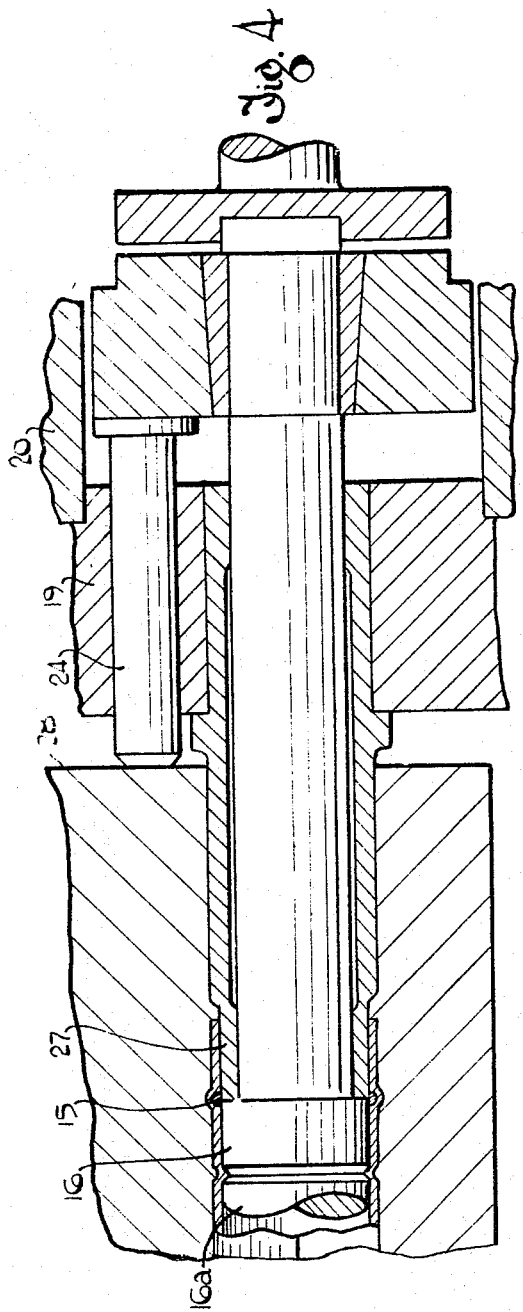
FIGURE 4 shows the apparatus at the end of the second stage or actual working stroke.

FIGURES 2 to 4 illustrate the improved method of and apparatus for forming the sleeve 1 with the fillet of solder 6. The apparatus comprises a die 7 in two parts 7a and 7b. When the two parts of the die are put together they define between them a cylindrical die opening 8. The die is divided on a plane 9 which contains the axis of the opening 8 and the two parts can conveniently be releasably clamped together by nuts and bolts or preferably quick release devices, one of which is diagrammatically illustrated by its centre line 10.

A joint sleeve 1 is placed within the die as indicated in FIGURE 2, being located therein by means of two appropriately spaced apart inwardly projecting annular abutments, only one 11 being shown in the drawing. At this stage the sleeve 1 is a uniform cylindrical member having a diameter slightly less than the diameter of the die opening 8. Midway along the length of the die there is provided another annular projection 12, the smallest diameter of which is equal to or only very slightly greater than the external diameter of the sleeve 1 at this stage. At a position approximately midway between the two annular abutments 11 and 12 the interior wall of the aperture 8 is formed with an annular recess 13 of approximately arcuate cross-sectional shape.

In alignment with the die opening 8 and externally thereof there is mounted a mandrel 14 which is carried on the forward end of a rod 15 which can be reciprocated axially to move the mandrel into and out of the die opening 8. The rod 15 is adapted to be driven by a hydraulic motor through a lost motion device to be described hereinafter. The mandrel 14 is of circular section having a diameter less than the internal diameter of the sleeve 1. At its forward end the mandrel 14 is formed with a circular section head 16 having a cylindrical exterior equal to the final internal diameter of the sleeve 1, that is slightly less than the internal diameter of the sleeve in its unformed state. At its extreme forward end the rod 16 is chamfered at 17. A sleeve 18 is a sliding fit on the mandrel 14, the external diameter of the major portion of the sleeve being such that it is a close sliding fit in the die opening 8. At its forward end 27 the sleeve diameter is locally reduced to that of the head 16 of the mandrel 14. The sleeve 18 is supported at its rear end in a sleeve carrying block 19 which itself is mounted on the forward end of a sleeve impeller 20. The sleeve impeller 20 surrounds with a clearance 22 a mandrel carrying block 21 whereby the mandrel 14 is connected to the forward end of the rod 15. The sleeve impeller 20 is also coupled to the aforementioned hydraulic motor. A collar 23 formed on and integral with the sleeve 18 constitutes an abutment in engagement with the forward face of the sleeve carrying block 19. From the front face of the mandrel carrying block 21 there extends a cylindrical stop bar 24 which is parallel with the mandrel 14 and extends through and in slidable engagement with the sleeve carrying block 19. The forward end of the stop bar 24 extends beyond the block 19 (FIGURE 2). An annular recess 25 is formed between oppositely directed annular faces on the rear and forward ends respectively of the mandrel head 16 and reduced portion 27 of the sleeve 18, the recess being bounded on its radially inner side by the cylindrical surface of the mandrel 14. In a manner and by means described below a loop of solder 26 can be placed in position in the recess 25, the dimensions of the loop being such that it will not project out of the recess beyond the cylindrical exterior of the mandrel head 16.

FIGURE 2 illustrates the relative arrangement of the various parts of the device just prior to the sleeve forming operation. By means of the aforementioned hydraulic motor the mandrel 14 and sleeve 18 are advanced into the die opening 8. The chamfered portion 17 of the mandrel head 16 facilitates the entry of the mandrel into the end of the sleeve 1 which is thereby expanded to its required diameter. The movement of the mandrel head 16 is continued until the forward face of the head is coincident with the plane of symmetry of the annular projection 12 midway along the length of the die opening. In this position the mandrel head comes into contact with a similar mandrel head 16a, which has entered the die opening from the other end. The annular projection 12 locally prevents the expansion of the sleeve 1 and at this position there is formed internally of the sleeve the inwardly projecting annular abutment 3 (FIG. 1) between the opposed chamfered portions 17 and 17a of the mandrel heads 16 and 16a. The arrangement is then in the condition illustrated in FIGURE 3 and in this position the stop bar 24 has come into contact with an abutment face 28 on the die 7. Further forward movement of the mandrel 14 is thus prevented but, by virtue of the aforementioned lost motion connection between the hydraulic motor and the mandrel 14, the sleeve 18 can continue to move forward under the drive imparted to it through the sleeve impeller 20. The effect of the continued forward movement of the sleeve 18 causes the solder 26 to be axially compressed between the opposed and mutually approaching annular boundary faces of the recess 25. This effect continues until the forward end of the sleeve 18 is substantially in engagement with the rear end of the head 16 and substantially all the solder 26 has been squeezed radially out of the recess 25. The pressure exerted by the solder locally expands the sleeve into the annular recess 13 to form on the sleeve the external annular projection 5 and internally of the sleeve the corresponding annular recess 4 to form the fillet 6. This is the condition illustrated in FIGURE 4. The mandrel 14 and sleeve 18 can now be completely withdrawn, leaving the solder 6 in position in the sleeve 1 and thereafter the die parts 7a and 7b can be separated to enable the formed sleeve to be removed.

FIGURE 5 shows in section the yoke-like support for the arrangement of the mandrel 14 and sleeve 18, parts of this support having already been mentioned with reference to FIGURES 2 to 4. The yoke comprises a box 29 having integrally aligned supporting spindles 30 and 31, referred to as the upper spindle 30 and the lower spindle 31, located about midway along the opposite upper and lower sides of the box and extending in opposite directions therefrom and at right angles thereto. The box 29 is formed with a parallel walled circular section cavity 32 which is co-axial with the mandrel 14. The forward end of the box constitutes the sleeve impeller 20 and the sleeve-carrying block 19 is fastened to this end of the box by means of bolts 33. Into the cavity 32 there is inserted from the rear end of the box 29 a liner 34 the length of which is about two-thirds that of the cavity 32 so that the forward end of the liner is spaced from the rear face of the sleeve-carrying block 19. At its rear end the liner 34 is formed with a radially and outwardly extending flange 35 which closely engages and is fastened to the rear end of the box 29. The liner 34 comprises a forward cavity 36 and a rearward cavity 37, open at opposite ends of the liner and having equal internal diameters, the forward cavity 36 being shorter than the rearward cavity 37 and being separated from it by an annular partition 38. The forward end 39 of an inner cylindrical liner 40 is a sliding fit in the partition 38. Rearwardly of the partition 38 the inner liner 40 is formed with a cylindrical enlargement 41 which is a sliding fit in the rearward cavity 37 and rearwardly of the enlargement the liner is formed as a cylindrical guide portion of smaller diameter than the rearward cavity 37. Into the forward end 39 of the inner liner 40 there extends, with a close fit, the rod 15 referred to in connection with FIGURES 2 to 4, and which extends centrally from and integrally with a disc-like member 42 which is fastened to the mandrel carrying block 21 by bolts 43 having countersunk heads presenting faces which are flush with the rear radial faces of the disc-like member 42. The earlier mentioned clearance space 22 extends between the mandrel carrying block 21 and the wall of the cavity 32 so that the block 21 can be made longitudinally moveable in the cavity 32. The diameter of the disc-like member 42 and an adjacent step formation 44 on the block 21 is less than the internal diameter of the forward cavity 36 of the inner liner 34 so that the parts 42 and 44 can be moved into and out of that cavity. Rearwardly of the rod 15 there extends a cylindrical clamping bar 45 which is a close fit in the inner liner 40. The bar 45 is formed at its forward end with an externally screw-threaded spigot 46 which is in screw-threaded engagement with the internally screw-threaded rod 15, and at its rear end with another externally screw-threaded spigot 47 for engagement by clamping nuts 48 which, by bearing against the end face of the inner liner 40 cause the parts 42, 15 and 45 to be clamped firmly in position in this liner and thereby provide a firm attachment of the mandrel 14 thereto. A bearing housing 49 is provided as a rearward annular extension of the flange 35 and a bearing bush 50 is screwed into the bearing housing 49, the bush being provided with a bearing liner 51 in which the rear end of the inner liner 40 is a close sliding fit. In the rear cavity 37 and between the opposed rear and front faces of the cylindrical enlargement 41 and the bearing bush 50 and encircling the rear end of the inner liner 40 there is provided a group of dished spring washers 52 which are in axial alignment and arranged in pairs in such a manner that the members of each pair present their concave faces toward one another; the group of spring washers thus comprises a compression spring.

When the mandrel 14 is withdrawn from the die 7 the relative positions of the various parts of the yoke-like support are as shown in FIGURE 5 and they remain so during the first part of the sleeve-forming operation. Throughout the sleeve-forming operation the support is moved forwardly by virtue of the connection of the upper and lower spindles 30 and 31 with a hydraulic motor and during the first part of the movement the mandrel 14 is kept in its forward position by the force of the spring 52 which maintains the cylindrical enlargement 41 of the inner liner 40 in a forward position in the rear cavity 37. At the end of the first part of the working stroke the stop bar 24 having engaged the rear face 28 of the die 7, further forward movement of the mandrel carrying block 21 is prevented and this results in relative movement of the inner liner 40 and the main liner 34 during which movement the spring 52, constituting the earlier mentioned lost motion device, is compressed. This relative movement continues to the end of the working stroke, that is to the condition illustrated in FIGURE 4.

Arrangements are provided to maintain the sleeve 18 in its advanced position relative to the mandrel 14 as the two are withdrawn from the die 7. The object of this is to avoid any tendency for the solder 6 to be drawn out of the annular recess 4 into the slot 25 if the sleeve 18 moved away from the head 16 of the mandrel before the mandrel moves rearwardly to at least such an extent that the rear face of the head 16 has moved away from the fillet of solder 6. By maintaining the slot 25 closed as indicated in FIGURE 4, while the mandrel is being withdrawn there is obtained a smooth cylindrical surface on the fillet of solder 6 as indicated in FIGURE 1. The arrangement for obtaining this result is as follows.

The upper end of the upper spindle 30 carries an oil reservoir 53 which is closed by the cap 54 and in the cap there is mounted a breather 55 formed with a passage 56 which establishes a permanent communication between the interior of the oil reservoir 53 and the atmosphere. In the base 57 of the reservoir 53 there is mounted a valve 58 on a stem 59 which can slide in a bush 60. A compression spring 61 acts on the valve 58 to tend to maintain it on a valve seating 62 at the exit end of a passage 63. A port 64 provides for the movement of oil between the oil reservoir 53 and the passage 63.

Extending into the passage 63 and from the opposite end thereof towards the valve seating 62 there is a head 65 of a plunger 66 which is a sliding fit in a bush 67. An abutment member 68 screwed on to the outer end of the plunger 66 is engaged by a compression spring 69 which biases the plunger into the position shown in FIGURE 5 in which the forward end of the head 65 of the plunger is out of engagement with the valve 58 when the valve is engaged with the valve seating 62. At its extreme out end the plunger 66 carries a ball contact 70 which can l engaged by a cam 71 to move the plunger 66 in the sen: to cause the head 65 of the plunger to engage the val\ 58 and lift the valve off its seating 62 in opposition to tl pressure of the valve spring 61. From the base 57 ( the oil reservoir 53 there extends downwardly a spigot 7 which makes screw-threaded liquid-tight engagement in recess 73 in the upper end of the upper spindle 30. duct 74 extends through the spigot from the delivery sic of the valve 58 to the lower end of the recess 73, and further duct 75 extends along the axis of the upper spind 30 from the recess 73 to the inner surface of the slee\ impeller 20 where this duct 75 opens into an annul recess 76 in the external surface of the liner 34. Fro this annular recess 76 passages 177 extend through tl annular partition 38 to open into the forward part 37 of the previously mentioned rearward cavity 37. Th part 37a of the rearward cavity 37 lies between the pa tition 38 and the cylindrical enlargement 41 of the inn liner 40. Referring to FIGURE 5 after the forwar motion of the sleeve 18 has been stopped, as describe above, the partition 38 will continue to move forwar with the sleeve 18 and the volume of the part 37a of tl rearward cavity 37 will increase due to the relative mov ment away from one another of the partition 38 and th cylindrical enlargement 41. The effect of this will be t cause oil to be drawn past the valve 58, which will ope automatically against the pressure of its spring 61, into th cavity 37a. At the end of the working stroke of th mandrel and at the beginning of its return movement th force of the spring 52 tends to move the parts 38 and 4 towards one another, but this is prevented by the presenc of oil in the cavity 37a, this oil being prevented b the valve 58 from being returned to the oil reservoir 5: However, at a later stage in the cycle, after the mandr has been completely withdrawn from the die 7, the ba contact 70 comes into such engagement with the cam 7 that the plunger 66 is displaced against its spring 69 t cause the head 65 of the plunger to engage the valve 5 and lift the valve off its seating 62. The compressio spring 52 can now expand to return the mandrel an sleeve to their original condition, the oil from the cavit 37a being returned to the oil reservoir. At a subsequer stage the ball contact 70 will be disengaged from th cam 71 to allow the valve 58 to reclose.

Figure 8:
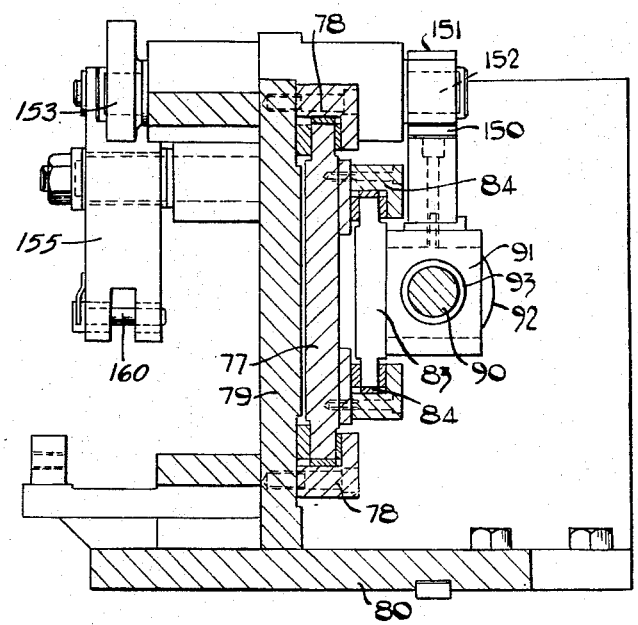
FIGURE 8 represents a section on the line VIII—VIII in FIGURE 7.

Referring to FIGURES 6 to 8, the tool-carrying yok which has been described above with reference to FIG URE 5 is carried by a main slide 77 which is reciprocabl in main guideways 78 located one above the other on th machine frame 79 which is fixed to a supporting base 8( The upper and lower spindles 30 and 31 of the yoke ar roatatably mounted in upper and lower bearings 81 an 82 respectively on the main slide 77. A sub-slide 83 i reciprocable in sub-guideways 84 on the main slide 7; The sub-slide 83 is attached to the forward end of th plunger 85 of a hydraulic motor, the forward end of th hydraulic cylinder 86 being anchored to the machin frame 79. The attachment of the plunger 85 to the sut slide 83 is by means of a spigot member 87 which is at tached to the forward end of the plunger, extends throug a rear bridge portion 88 of the sub-slide 83 and is engage at its forward end by a clamping nut 89, the arrange ment being such that the sub-slide 83 always moves wit the plunger. The main slide 77 is coupled to the sut slide 83 by a lost motion device which consists of a spigc 90 extending rearwardly from part of the main slide an being a sliding fit in a bearing sleeve 93 in a forwar bridge portion 91 of the sub-slide 83. The spigot 90 j longer than the passage through that forward bridge poi tion 91 and a collar 92 is screwed on to its rear enc When the plunger 85 is in its extreme retracted positior the rear face of the forward bridge portion 91 is in en gagement with the front face of the collar 92, and th front face of the forward bridge portion 91 is spaced fron abutment surface on the main slide 77. During the initial part of the working stroke of the plunger 85, in which the plunger moves towards the left hand in FIGURE 7, the sub-slide 83 moves with the plunger while the main slide 77 remains stationary. The forward bridge portion 91 of the sub-slide thus moves over the spigot 90 until the forward face of this portion 91 engages the aforementioned rearward abutment surface on the main slide 77. The relative positions of the slides 77 and 83 will now be as shown in FIGURE 7. During the remainder of the working stroke of the plunger 85 both slides are carried forward together.

During the initial part of the return stroke of the plunger 85, that is toward the right hand in FIGURE 7, the sub-slide 83 is first moved relatively to the main slide 77 until the rear face of the forward bridge portion 91 again abuts against the collar 92. During the remainder of this stroke of the plunger 85 the two slides move together.

Referring to FIGURES 5 to 7, the tool-carrying yoke, and thereby the forming tool, is angularly reciprocable through 90° about the axis of the upper and lower spindles 30 and 31 between the operative position shown in FIGURES 6 and 7 and a charging position into which the tool is turned in the direction of the arrow in FIGURE 6. In the charging position the loop 26 of solder is formed in the annular recess 25 by wrapping about the mandrel 14 an elongated portion of solder obtained by transversely cutting an initially flat strip 94 (FIGURE 1). The apparatus includes means, all operated from the moving slides 77 and 83, for longitudinally feeding and pre-shaping the strip, severing a portion from its forward end, turning the forming tool into the charging position, wrapping the portion of solder into the loop about the mandrel and returning the tool to its operative position. The device for effecting these operations and the manner of their operation will now be described.

The means for effecting the angular movement of the tool-carrying yoke comprises a pinion 95 keyed to the lower end of the lower spindle 31 below the bearing 82 and there is also keyed to the spindle in this position a lever 96. On the main slide 77 there is pivotally mounted a toothed quadrant 97, the axis of its pivot 98 being parallel to the axis of the pinion 95 and the teeth of the quadrant meshing with the pinion. A roller 99 is adapted to engage a cam 100 which is fastened to the stationary frame of the machine. The cam comprises a ramp 101 and a lift 102 which extends parallel to the direction of movement of the main slide. The end of the lever 96 is connected to the pivot 97 by a tension spring 103. In the position shown in FIGURE 14 the roller 99 is disengaged from the cam 100 and the effect of the spring 103 is to hold the arm 96 in such a position with a tool-carrying yoke in the operative position. During the latter part of the return stroke of the main slide 77 the roller 99 engages and rides up the ramp 101 on to the lift 102. The effect of this is to forcibly turn the quadrant clockwise, as seen in FIGURE 14, to the extent to rotate the pinion 95 through 90°, whereby the tool-carrying yoke is turned in the direction of the arrow in FIGURE 14 into the charging position. During the first part of the working stroke of the hydraulic plunger 85, while the sub-slide 83 is moving independently of the main slide 77 the tool-carrying yoke remains in the charging position; during the first part of the following movement, that is while the two slides are moving together, the roller 99 moves off the cam 100 to cause the yoke to be turned into the operative position. The limit of the movement of the yoke into the operative position is determined by means of a radius arm 104 mounted towards the upper end of the upper spindle 30 (FIGURES 6 and 7) which is adapted to its end to engage a fixed abutment 106 on the main slide 77. Small angular adjustments of the yoke can be effected by means of a stop member 105 which is in screw-threaded engagement with the arm 104 and which actually engages the abutment 106.

When the tool has turned through a small angle out of the operation position the above mentioned spring biased ball 70 comes into engagement with the fixed cam 71 to depress the plunger 66 and forcibly open the one-way valve 58 to permit oil to return to the reservoir 53. The cam 71 is of arcuate form as shown in FIGURE 6 so that the valve 58 is positively held open throughout almost the whole of the angular movement of the tool-carrying yoke.

Figure 13:
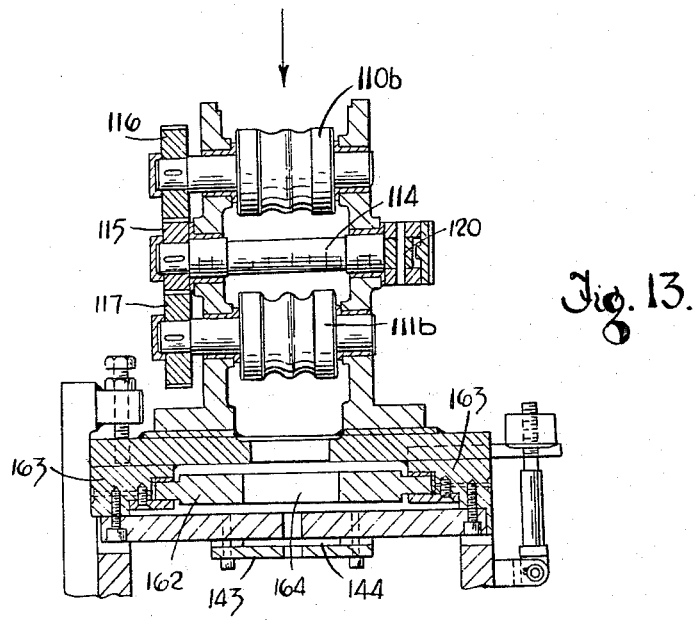
FIGURE 13 is a sectional view on the line XIII—XIII in FIGURE 6.

To the rear of the machine frame 79 there is removably clamped by means of pivotal bolts 107 a strip feeding, shaping and severing device 108 (FIGURE 6). Referring to FIGURES 6, 12 and 13 a flat strip of solder 94 (FIGURE 15a) is led over a roller 108a and then between two successive pairs of peripherally grooved edge-guiding rollers 109 and thence into the gap between a pair of driven preliminary shaping rolls 110a and 110b. The strip passes therefrom to a pair of driven final shaping rolls 111a and 111b. The shaping rolls are illustrated in FIGURES 12 and 13; in FIGURE 6 the references 110a ... 111b are applied to the ends of the roll spindles. The complementary surfaces of the shaping rolls are so contoured that after its passage through both pairs of rolls the strip acquires a cross-sectional shape comprising, as shown in FIGURE 15b, a central approximately semi-circular portion 112 and two outer reversely curved semi-circular portions 113.

The shaping rolls are driven by the following mechanism. A shaft 114 (FIGURE 13) extends between and parallel to the axes of the rolls 110b and 111b; a toothed driven wheel 115 on one end of the shaft 114 meshes with toothed wheels 116, 117 on the adjacent ends of the spindles of the rolls 110b and 111b. Toothed wheels 118 and 119 are also provided on the adjacent ends of the spindles of the remaining rolls 110a and 111a. The arrangement is such that when the shaft 114 is driven, the meshing toothed wheels 116–119 cause the pairs of rolls 110–111 to be driven so as to carry the strip of solder forwardly in the direction of the arrows in FIGURES 12 and 13. The shaft 114 carries a part 120a of an Oldham coupling 120 on its opposite end to the toothed wheel 115, the other half 120b of the coupling being formed on a shaft 121 to which is keyed a driven bevel gear wheel 122. The gear wheel 122 meshes with a driving bevel gear wheel 123 keyed to one end of a stub shaft 124 which is coupled at its other end, through a one way driving coupling 125, to a driving shaft 126. The coupling 125 is such that when the driving shaft 126 is rotated in the direction of the arrow in FIGURE 11 the drive will be transmitted to the stub-shaft 124 and therefrom to the pairs 110–111 of rolls to feed the strip 94 in the direction of the arrows in FIGURES 12 and 13, but that when the driving shaft is turned in the reverse direction no motion will be imparted to those rolls nor therefore to the strip 94.

On the outer end of the driving shaft 126 there is mounted a movable member 127 of a dog clutch, this member 127 being keyed to and longitudinally displaceable on the shaft 126 and being held in engagement with a second member 128 of the dog clutch by a compression spring 129 located between the movable member 127 and an abutment plate 130 fastened to the extreme end of the shaft 126. This end of the driving shaft 126 extends beyond a bearing 136 and carries between this bearing and the second member 128 of the dog clutch a lever 133 which is pivotal on the shaft 126 about a bearing sleeve 137. The second member 128 of the dog clutch is formed with a radial flange 131 located between two friction rings 138, the assembly being clamped between the side of the lever 133 and an outer pressure ring 132 by means of bolts 134 provided with spring washers 135 to form a friction clutch coupling between the lever 133 and the driving shaft 126. A spring 139 (FIGURES 7 and 11) tends to turn the lever 133 anti-clockwise as seen in FIGURE 7 against a fixed stop 140. A roller 141 on the end of the lever 133 is engageable by a stud 142, which is adjustably mounted on the above described main slide 77, as this slide moves through the last part of its working stroke, thereby turning the lever 133 against the pressure of the spring 139. This movement of the lever 133 drives the forming rollers 110–111 which advance the solder strip 94 until its leading edge abuts a stop plate 143 (FIGURES 9 and 13) with the end portion of the strip extending across a gap 144 behind the plate 143. The friction clutch 131, 138 can slip to prevent the leading edge of the strip of solder from being distorted by being excesively forced against the stop plate 143. During the return stroke of the main slide 77 the lever 133 is returned to its original position by the spring 139, but the second reverse motion of the driving shaft 126 is not transmitted to the forming rolls because of the presence of the one way coupling 125. A square end 145 on the shaft 121 carrying the driven bevel gear 122 is engageable by a handle to enable the forming rolls 110, 111 to be manually operated. Also manual adjustment of these rolls can be effected by turning the driving shaft 126 when the dog clutch is disengaged by displacement of the movable member 127 thereof against pressure of the spring 129.

It will be appreciated that during the latter part of the working stroke of the tool 14, 18, the solder strip 94 will have been advanced into a position wherein a piece of solder having the form shown in FIGURE 15b can be severed from its leading end. While the tool is still oriented in its operative direction, this severing action has to be effected and thereafter, when the tool has been turned into its charging position, the piece of solder so removed has to be formed into a loop about the mandrel 14. These operations are effected by the mechanism described below.

The sub-slide 83 carries a rack 150 (FIGURE 7) which is engaged by a pinion 151 on the end of a shaft 152 which is mounted in bearings on the machine frame. The other end of the shaft 152 has keyed to it a cam 153 (FIGURE 9) having a 45° lobe 154, the remaining surface of the cam being circular. A lever 155 pivotally mounted at 156 on the machine frame carries at one end a roller 157 which is held in engagement with the cam 153 by a tension spring 158 attached to the other end of the lever 155. A link 159 of adjustable length is pivotally connected at one end 160 to the last mentioned end of the lever 155 and at its other end 161 to a slide 162. The slide 162 is reciprocable in parallel guides 163 extending transversely to the direction of feeding of the solder strip 94 and one on each side of the path of the strip at a position rearwardly of the stop plate 143. A recess 164 in the slide 162 enables it to move without coming into contact with the strip 94. Pivotally mounted on the slide 162 is a tool carrier 165 on which are mounted a cutter 166 and a forming tool 167. The cutter and forming tool extend radially with respect to the pivot 168 of the tool carrier 165, and are about 45° apart as indicated in FIGURE 9. In one position, the cutting position, of the tool carrier 165, the cutter 166 is so positioned that when the slide 162 is moved towards the left hand, as seen in FIGURE 9, the end of the cutter 166 will engage the end of the solder strip 94 behind the stop plate 143. The end of the cutter 166 is shaped to conform to the corrugated formation of one side of the solder strip in this position. On the stationary part of the device there is provided a cooperating cutter bar 169, the operative edge of which is complementary to the end of the cutter 166, that is to conform to the other side of the solder strip. When the cam 153 is turned in one direction, the lever 155 is displaced against the force of the spring 158, to move the slide 162 and hence the cutter 166 in the sense to sever a piece of solder from the end of the strip of solder. After the severing action the movement of the cutter 166 is continued to displace the removed piece of solder to a position adjacent a recess 170 in one edge of the stop plate 143. Referring to FIGURE 13, the stop plate 143 can be so mounted that the space 144 behind it is slightly tapered in the direction of displacement of the removed piece of solder, so that when the cutter 166 is returned by the spring 158 the piece of solder will remain frictionally held.

Before the cam 153 is again turned, the tool carrier 165 will have been turned on its pivot 168 to bring the forming tool 167 into its operative position. The end of the forming tool 167 is a semi-circular recess 171, as indicated diagrammatically in FIGURES 15b and 15c. On the next operation of the cam 153 the tool carrier 165 will again be operated to cause the forming tool 167 to engage, with its recess 171, the severed piece of solder and deform it into the loop of solder 26 about the mandrel 14 which is now in the charging position in the recess 170 in the stop plate 170.

The pivotal mounting 168 for the tool carrier 165 comprises the end of a spindle 172 (FIGURE 10) on the other end of which is mounted a gear wheel 173 which meshes with a worm wheel 174. The worm wheel is driven by a pneumatic relay 175 which effects an oscillating movement of the tool carrier 165 about its pivot 168. Fixed to the machine frame so as to engage the pneumatic relay there is provided a triggering member which is so located that when the slide 162 is returned to the right hand in FIGURE 9 by the spring 158 the pneumatic relay 175 will engage this triggering device and effect the appropriate angular movement of the tool carrier 165. Thus after the strip severing operation carried out by the cutter 166, the pneumatic relay will cause the tool carrier 165 to be turned clockwise to bring the forming tool 167 into an operative position. The next time the pneumatic relay 175 is triggered the tool carrier 165 will be turned in the opposite sense to bring the cutter 166 into the operative position.

The cam 153 will be turned in one direction as the sub-slide 83 moves during the first part of its operative stroke and before operative movement is imparted to the main slide 77 and this will effect the charging of the mandrel 14 with the loop of solder, the mandrel being at this stage in the charging position. Thereafter the movement of the main slide 77 will cause the mandrel 14 to be turned into its operative position and towards the end of the operative movement of the main slide the lever 133 will be displaced to effect the next feeding step of the solder strip 94. During the return movement of the sub-slide 83 the cam 153 will be turned into the reverse sense to effect the next strip severing operation, the tool carrier 165 having been moved to bring the cutter 166 into the operative position. The strip severing operation occurs before the mandrel 14 is turned into the charging position, ready to be charged by the next forward stroke of the sub-slide 83.

In FIGURE 16 there is represented an alternative method and apparatus for applying the loop of solder 26 about the mandrel 14 behind the head 16 of the mandrel when the forming tool is in the charging position. In the figure the mandrel 14 is represented in the charging position, into and out of which it is movable from and towards the left hand side of the drawing as indicated by the double arrow. The loop 26 is formed at one end of a longer length 178 of solder wire which is fed longitudinally through a passage 179 in a guide block 180. The passage 179 extends tangentially or approximately tangentially to the surface of the mandrel 14, the end of the guide block 180 being so located as not to obstruct the movement of the mandrel into and out of the charging position. After leaving the passage 179 the forward end of the wire 178 meets the radially inner face of an arcuate guide 181 which is co-axial with the mandrel 14 and is located on the right hand side of the charging position so as also not to obstruct the movement of the mandrel to and from the charging position. The effect of the guide 181 is to cause the advancing end of the wire 178 to form the loop 26. The feeding movement of the wire 178 ceases when it has advanced an amount corresponding to the length of the loop 26. A cutter bar 184 is mounted for reciprocation in a guide way 186, extending at right angles to the passage 179. The operative end 185 of the cutter bar 184 is formed with a cutting edge adapted to co-operate with a cutting face 182 on the block 180 at the end of the passage 179 to sever the loop 26 from the main length of wire 178 when the cutter bar 184 is moved inwardly. This end 185 of the cutter bar is also so formed that it will engage the inner end 186 of the severed loop 26 and by its continued movement, after the cutting, will deflect that end 186 into the annular slot 25 (FIGURE 2) as indicated in broken line in FIGURE 16.

The arrangements for advancing the wire 178 may be generally similar to those already described for advancing the solder strip 94 except that the operation thereof will be effective while the forming tool is in the charging position. Also the arrangement for operating the cutter bar 184 may be generally similar to the already described means for effecting the transverse cutting of the solder strip 94, this operation also being effected while the forming tool is in the charging position and after the wire 178 has been fed forward the appropriate distance to form the loop 26.

What I claim then is:

1. Apparatus for forming an internal annular solder-filled recess in a pipe-receiving portion of a metal pipe-jointing member; comprising a forming tool consisting of a mandrel, an enlarged head on said mandrel and a sleeve which is a sliding fit on said mandrel, said sleeve co-operating with said head of the mandrel to form an annular solder-receiving receptacle; a reciprocable driving member for moving said forming tool into and out of the pipe-receiving portion; a direct coupling between said driving member and said sleeve; a resilient deformable coupling between said driving member and said mandrel; abutment means for arresting the movement of said mandrel into said pipe-receiving portion, said resilient deformable coupling being deformable by said driving member to permit said sleeve to be further moved by said driving member into said pipe-receiving portion towards said head to close said receptacle when said mandrel is so arrested; said resilient deformable coupling, when so deformed, exerting pressure to move said sleeve in the reverse sense relative to said mandrel when said forming tool is withdrawn; and means for preventing movement of said sleeve in the reverse sense relatively to said mandrel until said forming tool has been moved through a distance along its withdrawal stroke, said last mentioned means comprising a liquid receiving chamber connected through a valve to a reservoir, a wall of said chamber being movable with said sleeve, to permit the volume of said chamber to be altered by movement of said wall with said sleeve during the first mentioned movement of said sleeve relatively to said mandrel, said valve providing for flow of liquid between said chamber and said reservoir during said first mentioned movement of said sleeve and being biased closed to prevent reverse flow of the liquid, thereby to prevent reverse movement of said sleeve relatively to said mandrel, during movement of the forming tool through said distance of its withdrawal stroke, and means for thereafter automatically opening said valve to permit such reverse flow and thereby the reverse movement of said sleeve relatively to said mandrel.

2. Apparatus according to claim 1 including a pivotal connection between said driving member and said forming tool, means for maintaining said forming tool aligned along the path of its movement into and out of said die, means for turning said forming tool out of that alignment when said forming tool is at the end of its withdrawal stroke, and means for forming a loop of solder in said annular receptacle when said forming tool has been turned, said opening means for the valve comprising a cam on the driving member which engages with the valve as the forming tool turns so that said reverse movement of the sleeve relative to the mandrel has been completed before said loop of solder is formed in the receptacle.

3. Apparatus for forming an internal annular solder-filled recess in a pipe-receiving portion of a metal pipe-jointing member; comprising a forming tool consisting of a mandrel, an enlarged head on said mandrel and a sleeve which is a sliding fit on said mandrel, said sleeve co-operating with said head of the mandrel to form an annular solder-receiving receptacle; a reciprocable driving member for moving said forming tool into and out of the pipe-receiving portion; a direct coupling between said driving member and said sleeve; a resilient deformable coupling between said driving member and said mandrel; abutment means for arresting the movement of said mandrel into said pipe-receiving portion, said resilient deformable coupling being deformable by said driving member to permit said sleeve to be further moved by said driving member into said pipe-receiving portion towards said head to close said receptacle when said mandrel is so arrested; said resilient deformable coupling, when so deformed, exerting pressure to move said sleeve in the reverse sense relative to said mandrel when said forming tool is withdrawn; and means for preventing movement of said sleeve in the reverse sense relatively to said mandrel until said forming tool has been moved through a distance along its withdrawal stroke, said last mentioned means comprising a liquid-receiving chamber having a wall movable with the sleeve to permit the volume of the chamber to be increased upon movement of said wall with said sleeve during the first mentioned movement of said sleeve relatively to said mandrel, valve means connecting the chamber to a source of liquid when the chamber has its increased volume and preventing escape of liquid therefrom during movement of the forming tool through said distance of its withdrawal stroke, and means for thereafter automatically opening said valve to permit such reverse flow and thereby the reverse movement of said sleeve relatively to said mandrel.

References Cited by the Examiner

UNITED STATES PATENTS

| | | | |
|---|---|---|---|
| 1,370,074 | 3/1921 | Vasselli | 29—157 |
| 1,754,922 | 4/1930 | Weldon | 153—73 |
| 1,973,436 | 9/1934 | Hjort | 28—550 |
| 2,120,067 | 6/1938 | Gray et al. | 29—157 |
| 3,220,098 | 11/1965 | Arbogast | 29—421 |

CHARLES W. LANHAM, *Primary Examiner.*

R. J. HERBST, *Assistant Examiner.*